United States Patent [19]

Hoeg

[11] 3,888,630
[45] June 10, 1975

[54] BREATH TESTING METHOD
[75] Inventor: Donald F. Hoeg, Mt. Prospect, Ill.
[73] Assignee: Borg-Warner Corporation, Chicago, Ill.
[22] Filed: Dec. 26, 1973
[21] Appl. No.: 428,159

[52] U.S. Cl.......... 23/232 E; 23/230 B; 23/253 PC; 23/230 PC; 23/254 E; 128/2 C
[51] Int. Cl...................... G01n 33/16; G01n 27/68
[58] Field of Search........... 23/232 E, 254 E, 230 B, 23/253 PC; 128/2 C

[56] References Cited
UNITED STATES PATENTS

| | | | |
|---|---|---|---|
| 3,528,779 | 9/1970 | Fontijn | 23/232 E |
| 3,647,387 | 3/1972 | Benson et al. | 23/232 E |
| 3,734,691 | 5/1973 | Kukla et al. | 23/254 E |
| 3,746,514 | 7/1973 | Colvin et al. | 23/254 E |
| 3,749,929 | 7/1973 | Wooten et al. | 23/232 E |
| 3,785,774 | 1/1974 | Murphy | 23/254 E |

Primary Examiner—R. E. Serwin
Attorney, Agent, or Firm—James E. Tracey

[57] ABSTRACT

Alcohol content of subject's breath is determined by flowing a breath sample over a combusting surface, provided by a heated catalyst, to cause oxidation of the alcohol constituent which, in turn, produces oxyluminescence or light emission of a magnitude directly proportional to the alcohol concentration. A light-responsive device, such as a photomultiplier, effectively converts the oxyluminescence to an electrical information signal whose amplitude accurately represents the breath alcohol concentration.

1 Claim, 1 Drawing Figure

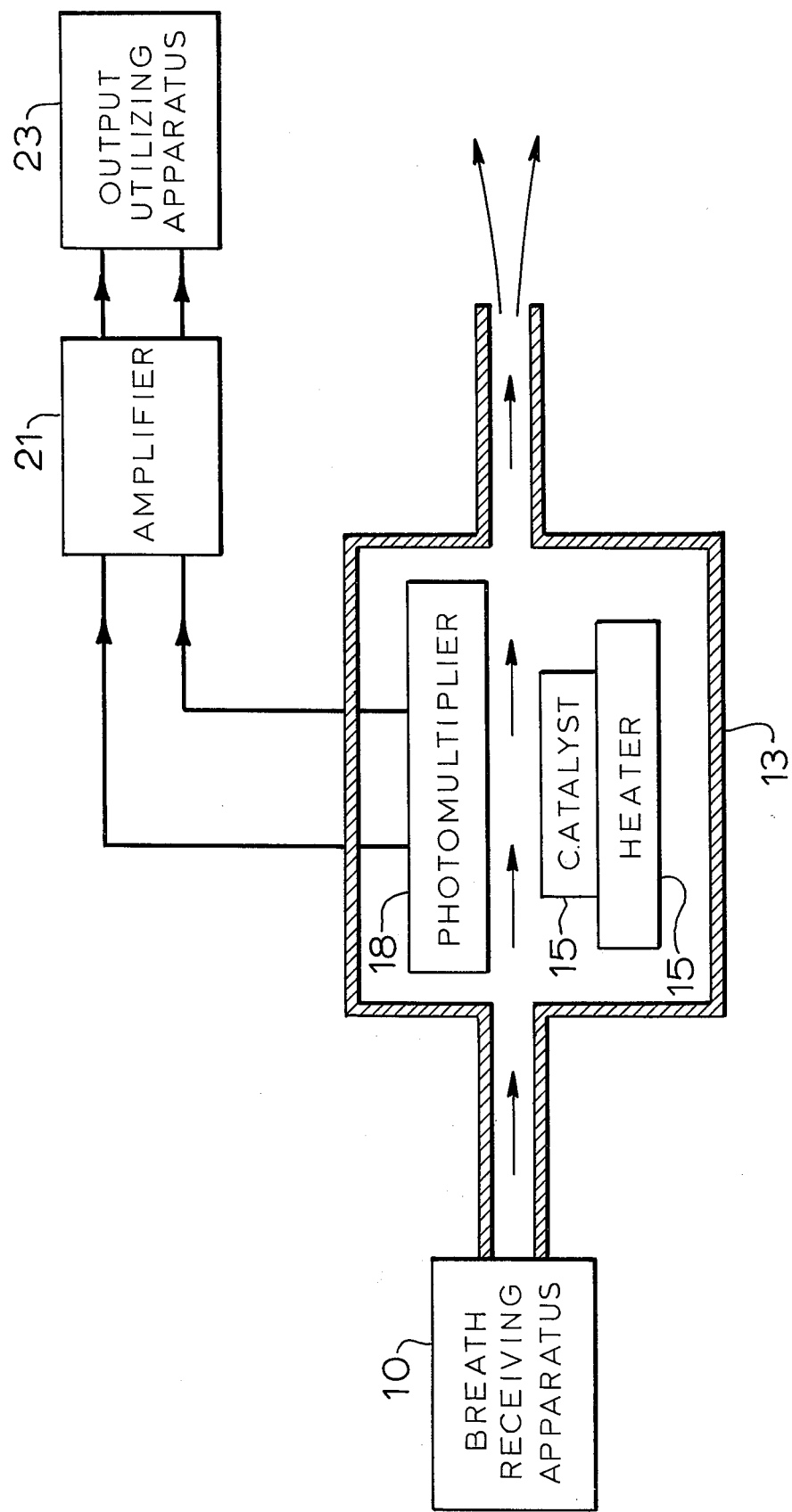

BREATH TESTING METHOD

BACKGROUND OF THE INVENTION

Various breath testing systems have been developed for evaluating a person's breath to detect its alcohol level. In one well known system, a sample of the breath to be analyzed is passed over a heated catalyst resistance element where any alcohol present in the breath sample oxidizes. The heat of the oxidation reaction causes the temperature and consequently the resistance of the catalytic element to increase, and this causes an information signal to be produced which indicates the particular alcohol level in the breath sampled. Usually, the catalytic element forms one leg of a normally-balanced wheatstone bridge that becomes unbalanced when the resistance of that element changes as a result of oxidation of breath alcohol, the degree of unbalance being proportional to the alcohol concentration.

The present invention constitutes a significant improvement over prior breath analyzers, particularly the conventional bridge type alcohol detector, since the same results are achieved with a testing arrangement that is considerably simpler and less complex than any of those developed heretofore.

SUMMARY OF THE INVENTION

In accordance with the invention, a novel method is disclosed for determining breath alcohol concentration. The method comprises the steps of providing a sample of breath received from a person to be tested; establishing a combusting zone; flowing the breath sample through the combusting zone to oxidize any alcohol present in the sample, thereby producing oxyluminescence in an amount proportional to the alcohol concentration; and developing, in response to the oxyluminescence, an electrical information signal indicative of the alcohol level in the breath sample.

DESCRIPTION OF THE DRAWING

The features of the invention which are believed to be novel are set forth with particularity in the appended claim. The invention, together with further advantages and features thereof, may best be understood, however, by reference to the following description in conjunction with the accompanying drawing, the single FIGURE of which illustrates, partly in block diagram form, a breath testing system constructed in accordance with one embodiment of the invention.

DESCRIPTION OF THE ILLUSTRATED EMBODIMENT

Breath receiving apparatus 10 develops a measured sample of breath received from a subject under test. The apparatus may take any suitable construction to facilitate the receipt of breath blown or exhaled by the person and to deliver a sample of that breath to the outlet of the apparatus, the unused breath being vented or dumped to the atmosphere. One example of an appropriate form for apparatus 10 is found is U.S. Pat. No. 3,764,270, issued Oct. 9, 1973 in the names of Donald W. Collier, Joseph P. Hoppesch and Anthony C. Mano. While not essential for the proper operation of the present invention, apparatus 10 preferably includes control equipment to make certain that the breath sample constitutes deep lung breath. Suitable control equipment to perform that function is also illustrated and described in U.S. Pat. No. 3,764,270. There, a breath sample is not produced at the outlet of the breath receiving apparatus until a continuous uninterrupted breath flow has occurred for a predetermined time period, such as five seconds. A sample taken at the end of a five-second interval of uninterrupted blowing or exhaling constitutes deep lung breath, from which an accurate reading of alcohol level may be obtained as is well known in the art.

Each breath sample from apparatus 10 is passed through a light-tight enclosure 13 to the outside atmosphere. As it travels through the enclosure its alcohol concentration is detected. To explain, a catalytic element 15 is heated by means of a suitable heater 16 to establish a combusting zone through which the breath samples flow. As the alcohol constituent passes through the zone and contacts the combusting surface, oxidation occurs accompanied by oxyluminescence. In other words, the combustion of the alcohol results in the emission of light from catalyst 15, the emission level being directly proportional to the alcohol concentration in the breath sample. Of course, a catalyst is not needed to produce the required combusting zone. Any material will do so long as its surface is capable of producing combustion.

The light emission from catalyst 15 impinges on light-responsive device 18, which takes the form of a photomultiplier in the illustrated embodiment. In response to the light emission, photomultiplier 18 produces an electrical information signal having an amplitude that reflects the breath alcohol level. The signal is amplified in amplifier 21 to a level adequate to operate output utilizing apparatus 23 which may, for example, constitute a meter that effectively measures the signal amplitude, thereby providing a visual display of the alcohol concentration in the tested breath sample. Alternatively, output apparatus 23 can be a simple bulb energized when the information signal exceeds a predetermined threshold amplitude level. Actually, apparatus 23 may take any of a variety of different forms inasmuch as there are many devices that can be controlled by an electrical signal whose amplitude signifies the alcohol level of a person's breath.

While it has not been shown in the drawing, a filter would preferably be interposed between catalyst 15 and photomultiplier 18 to filter out any infra-red background.

The invention provides, therefore, an improved breath alcohol detector which is of relatively simple construction but yet achieves very accurate results.

While a particular embodiment of the invention has been shown and described, modifications may be made, and it is intended in the appended claim to cover all such modifications as may fall within the true spirit and scope of the invention.

I claim:

1. A method for determining breath alcohol concentration comprising the steps of:
   providing a sample of breath received from a person to be tested;
   establishing a combusting zone;
   flowing said breath sample through said combusting zone to oxidize any alcohol present in said sample, thereby producing oxyluminescence in an amount proportional to the alcohol concentration;
   and developing, in response to the oxyluminescence, an electrical information signal indicative of the alcohol level in said breath sample.

* * * * *